V. H. VALLELY.
EDUCATIONAL APPLIANCE.
APPLICATION FILED JAN. 10, 1917. RENEWED FEB. 12, 1918.
1,260,601. Patented Mar. 26, 1918.
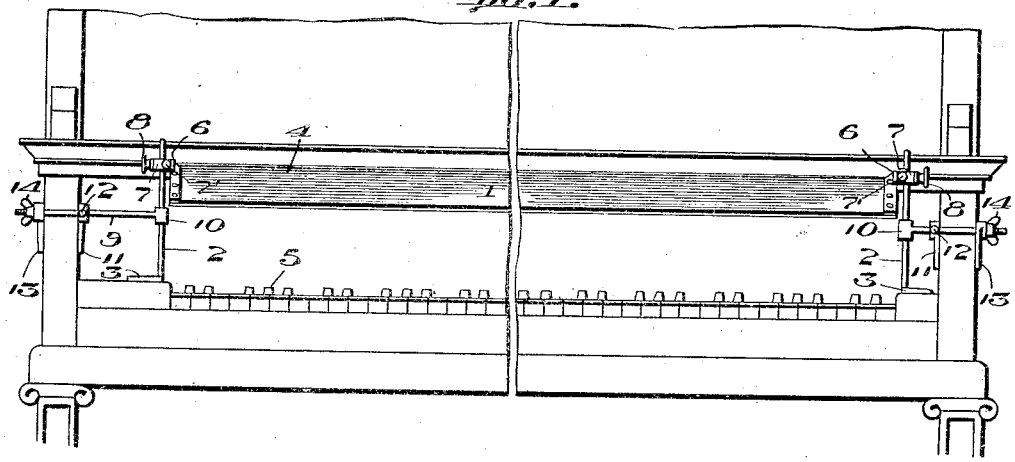
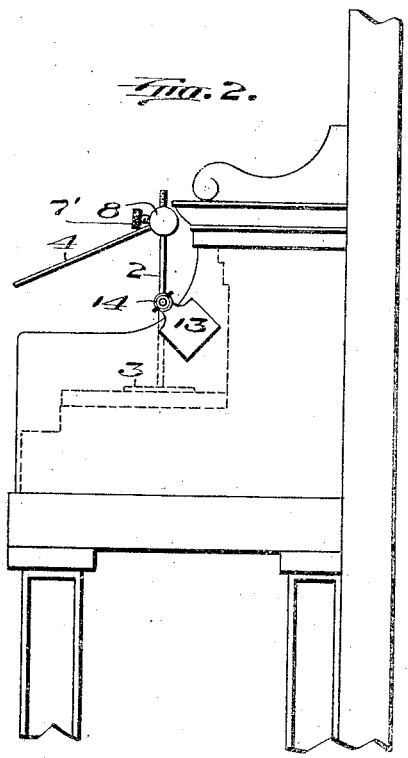
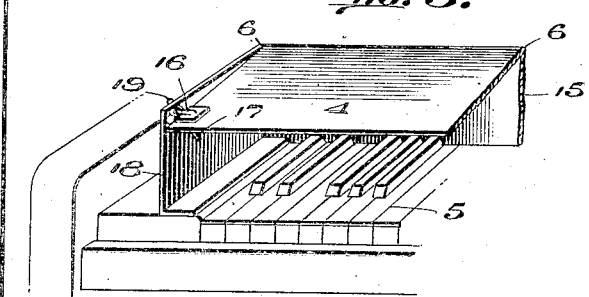
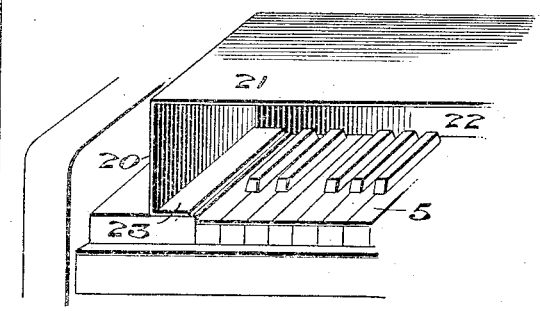
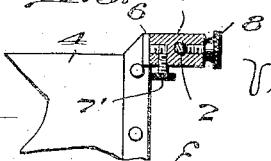
Witnesses
Philip E. Barnes
Frank A. Kane
Inventor
Victor H. Vallely,
by
Edmund H. Parry, Atty

UNITED STATES PATENT OFFICE.

VICTOR HUGO VALLELY, OF ST. LOUIS, MISSOURI.

EDUCATIONAL APPLIANCE.

1,260,601. Specification of Letters Patent. Patented Mar. 26, 1918.

Application filed January 10, 1917, Serial No. 141,628. Renewed February 12, 1918. Serial No. 216,784.

*To all whom it may concern:*

Be it known that I, VICTOR HUGO VALLELY, a citizen of the United States, residing at St. Louis, in the county of St. Louis and State of Missouri, have invented certain new and useful Improvements in Educational Appliances, of which the following is a specification, reference being had therein to the accompanying drawing.

This invention relates to educational appliances. While it is of general application, it is especially adapted for use in connection with teaching the manipulation of various key boards and keys by means of a so-called touch system.

It is a well established fact that it is easier to use one sense separately, than to use several concomitantly. This fact is made use of in the so-called touch systems, by confining the use of the sense of sight to one object—generally the reading of manuscript, notes, and the like—and training the fingers or hands to naturally seek out and select the proper keys, for example, without using the eyes on the keys.

A device, by the use of which the sense of sight may be directed to one occupation only, and the sense of touch to another, but individual duty, is calculated to develop a higher degree of correlation between these two senses and at the same time effect a better grade of work from each one individually. The production of such a device is the primary object of the present invention.

An instrumentality of this kind which may be readily associated with and detached from a key board; which will be capable of a variety of adjustments adapted to meet the requirements of universal application; which will effectively obstruct the view of the operator from the keys themselves, and at the same time permit free and unobstructed use of the hands and fingers, has been found very efficacious.

It is a further object of the present invention to produce an instrumentality embodying the above advantageous features.

Other objects and advantages will in part be apparent and in part be brought out in the description which follows.

A drawing is hereto appended in which several embodiments of the invention are illustrated, the following views being shown:—

Figure 1 is a broken view in front elevation showing the application of the device to a key board of well known construction;

Fig. 2 is a view in side elevation of the same;

Figs. 3 and 4 are detail views in perspective of other embodiments; and

Fig. 5 is a detail view partly in section of a portion of the apparatus.

Referring specifically to these drawings, the numeral 1 designates generally my device. As herein shown it comprises a support which may include a standard 2, a pedestal or foot 3 and a blind or view-obstructing element 4.

This blind or view obstructing element is preferably arranged so that it will cut off the view of an operator from a key board or the keys thereof which are herein designated by the numeral 5. To accommodate various conditions of usage, this blind member may be pivotally mounted upon the support as upon pivot points 6 and it may also be capable of adjustment vertically upon said supports. For this purpose as herein shown, there is provided at each end of said blind a block 7 surrounding and movable upon the upright members 2 and held in any desired point thereon as by thumb screws 8. Means are also provided for effecting a pivotal adjustment of the blind upon the pivot points. To this end the pivot points are movably mounted on the blocks 7 and held in any desired adjustment thereon as by thumb screws 7'.

In addition to the supports 2, there may be also provided a separate bracing and supporting means which as herein shown, comprises a member 9 having at one end a sleeve portion 10 adapted to surround the supports or standards 2 and capable of slidable movement thereon. These standards have intermediate their ends, feet 11 capable of adjustment thereon as by screws 12 and adapted to coöperate with corresponding feet 13 confined upon the rod as by thumb screws 14 threaded on the free ends of the standard 9. In Fig. 3, there is shown a slightly modified form in which the blind 4 is pivoted upon pivot points 6 arranged at the inner end thereof upon a backing member 15, the pivotal adjustment of said blind being effected by means of a stud 16 passing through a slot 17 in a side member or support 18 and held in various positions in said slot by means of a thumb screw 19.

In Fig. 4, the embodiment disclosed is adapted to be made in the form of a unitary structure having side members 20, blind 21, and rear portion 22 formed integrally in the shape of a housing or inclosure. The side member 20 may likewise be provided with a foot portion 23 to effect a steadier positioning of the device especially when used upon a keyboard of the piano or organ type.

I am aware that it has heretofore been proposed to use in connection with a piano or organ key board, a plurality of standards or supporting members in connection with cross pieces adapted to form rests or supports for the hands or wrists, or to have elastic depending members adapted to be utilized for finger exercises. I am also aware that it has heretofore been proposed to cover the keys of a typewriter, for example, by individual caps or the like and sometimes to even blindfold the operator as an aid in teaching touch systems.

The present appliance and the principle involved therein are to be distinguished from devices of this kind, however, for the reason that while the operator is permitted free use of the sense of sight for the purpose of reading the manuscript, notes or the like, his view of the key board is completely obstructed, the arrangement being such that the fingers must naturally seek out and find the desired keys without the aid of the sense of sight. This feature is especially valuable in the teaching of music as in addition to the special training which is given to the hands and fingers, the sense of hearing is allowed more freedom, that is the operator can listen more attentively and his ear will be much more rapidly developed than it would otherwise be if it were necessary for the eyes to be used on the key board at the same time that they are being used to follow the notes.

While I have disclosed my invention in the embodiment herein shown, it will be evident that I do not desire to limit myself to the precise form shown nor to any form wherein the same may be carried into effect, as many changes may be made in the general construction and arrangement of parts without departing from the spirit of the invention or sacrificing its chief advantages.

What I claim is:

1. An educational appliance for use in teaching the touch system in connection with key manipulation, which comprises a plurality of supporting members; an adjustable pivot block slidably mounted on each support and a view obstructing member mounted on said pivot blocks.

2. An educational appliance for use in teaching the touch system in connection with key manipulation, which comprises a plurality of supporting members; an adjustable pivot block slidably mounted on each support; a view obstructing member mounted on said pivot blocks; and additional supporting means comprising rods slidably mounted at one end on said supports; an adjustable foot member disposed intermediate the ends of each rod; and a pressure foot adjustably mounted at the outer end of each rod.

In testimony whereof I affix my signature in presence of two witnesses.

VICTOR HUGO VALLELY.

Witnesses:
RUTH I. MILLER,
HARVEY R. LINBARGER.

Copies of this patent may be obtained for five cents each, by addressing the "Commissioner of Patents, Washington, D. C."